(12) United States Patent
Kramer

(10) Patent No.: US 11,305,693 B2
(45) Date of Patent: Apr. 19, 2022

(54) MIRROR ASSEMBLY

(71) Applicant: Russell Kramer, Sandwich, MA (US)

(72) Inventor: Russell Kramer, Sandwich, MA (US)

(*) Notice: Subject to any disclaimer, the term of this patent is extended or adjusted under 35 U.S.C. 154(b) by 1 day.

(21) Appl. No.: 16/404,965

(22) Filed: May 7, 2019

(65) Prior Publication Data

US 2019/0337456 A1 Nov. 7, 2019

Related U.S. Application Data

(60) Provisional application No. 62/666,695, filed on May 3, 2018.

(51) Int. Cl.
*B60R 1/00* (2022.01)
*B60R 1/078* (2006.01)

(52) U.S. Cl.
CPC .............. *B60R 1/007* (2013.01); *B60R 1/078* (2013.01)

(58) Field of Classification Search
CPC .......... B60R 1/007; B60R 1/078; B60R 1/081
See application file for complete search history.

(56) References Cited

U.S. PATENT DOCUMENTS

| | | | | |
|---|---|---|---|---|
| 2,582,651 A | * | 1/1952 | Peterson | B60R 1/081 359/865 |
| 2,802,394 A | * | 8/1957 | Krone | B60R 1/081 359/854 |
| 3,826,563 A | * | 7/1974 | Davis | B60R 1/081 359/865 |
| 3,977,774 A | * | 8/1976 | O'Sullivan | B60R 1/078 359/851 |
| 4,200,359 A | * | 4/1980 | Lawson | B60R 1/082 248/467 |
| 4,381,142 A | * | 4/1983 | McColgan | B60R 1/025 359/865 |
| 4,394,065 A | * | 7/1983 | Swanson | B60R 1/007 359/844 |
| 4,504,118 A | * | 3/1985 | Harig | B60R 1/081 248/479 |
| 4,526,446 A | * | 7/1985 | Adams | B60R 1/081 359/864 |
| 4,598,982 A | * | 7/1986 | Levine | B60R 1/081 359/865 |
| 4,728,180 A | * | 3/1988 | Janowicz | B60R 1/081 359/841 |
| 4,824,231 A | * | 4/1989 | Quintana | B60R 1/081 248/479 |
| 4,832,476 A | * | 5/1989 | Gabrielyan | B60R 1/081 248/479 |
| 4,892,400 A | * | 1/1990 | Brookes | B60R 1/078 359/865 |

(Continued)

FOREIGN PATENT DOCUMENTS

| | | | | |
|---|---|---|---|---|
| DE | 2622495 A | * | 11/1977 | |
| DE | 4039981 A1 | * | 6/1992 | ............. B60R 1/078 |

(Continued)

*Primary Examiner* — Eret C McNichols
(74) *Attorney, Agent, or Firm* — Jonathan B. David

(57) ABSTRACT

A mirror assembly can comprise a blind spot mirror hingedly linked to other structures. Through various means, the mirror assembly can be placed and the blind spot mirror adjusted so as to provide a user with enhanced visibility into the blind spot of a vehicle.

10 Claims, 10 Drawing Sheets

(56) References Cited

U.S. PATENT DOCUMENTS

| | | | | |
|---|---|---|---|---|
| 4,927,255 | A * | 5/1990 | Martinez | B60R 1/081 359/855 |
| D316,996 | S * | 5/1991 | Swauger | D12/187 |
| 5,044,739 | A * | 9/1991 | do Espirito Santo | B60R 1/082 359/864 |
| 5,691,855 | A * | 11/1997 | Lupkas | B60R 1/081 359/862 |
| 5,724,199 | A * | 3/1998 | Hu | B60R 1/078 359/871 |
| 5,870,236 | A * | 2/1999 | Barksdale | B60R 1/078 359/872 |
| 5,946,149 | A * | 8/1999 | Hoffman | B60R 1/081 359/854 |
| 5,946,150 | A * | 8/1999 | Liao | B60R 1/081 248/467 |
| 6,193,377 | B1 * | 2/2001 | Spigner | B60R 1/0605 248/479 |
| 6,485,151 | B2 * | 11/2002 | Coleburn | B60R 1/082 248/480 |
| 6,926,416 | B2 * | 8/2005 | Sawyer | B60R 1/081 248/467 |
| 7,097,312 | B2 * | 8/2006 | Platzer, Jr. | B60R 1/082 359/864 |
| 7,628,498 | B1 * | 12/2009 | Huang | B60R 1/078 359/871 |
| 2004/0150900 | A1 * | 8/2004 | VanderHorst | B60R 1/078 359/871 |
| 2007/0109677 | A1 * | 5/2007 | Bender | B60R 1/078 359/877 |
| 2010/0259842 | A1 * | 10/2010 | Liu | B60R 1/078 359/872 |
| 2011/0051268 | A1 * | 3/2011 | Martin | B60R 1/081 359/846 |
| 2012/0162800 | A1 * | 6/2012 | Kim | B60R 1/081 359/865 |
| 2013/0222935 | A1 * | 8/2013 | Furlow, Jr. | B60R 1/082 359/868 |
| 2018/0194287 | A1 * | 7/2018 | Arndt | B60R 1/081 |
| 2019/0202358 | A1 * | 7/2019 | Arndt | B60R 1/12 |

FOREIGN PATENT DOCUMENTS

| | | | | |
|---|---|---|---|---|
| DE | 9205023 | U1 * | 6/1992 | B60R 1/078 |
| DE | 102005062046 | B3 * | 8/2007 | B60R 1/078 |
| EP | 1767404 | A1 * | 3/2007 | B60R 1/078 |
| NL | 9002818 | A * | 7/1992 | B60R 1/078 |

\* cited by examiner

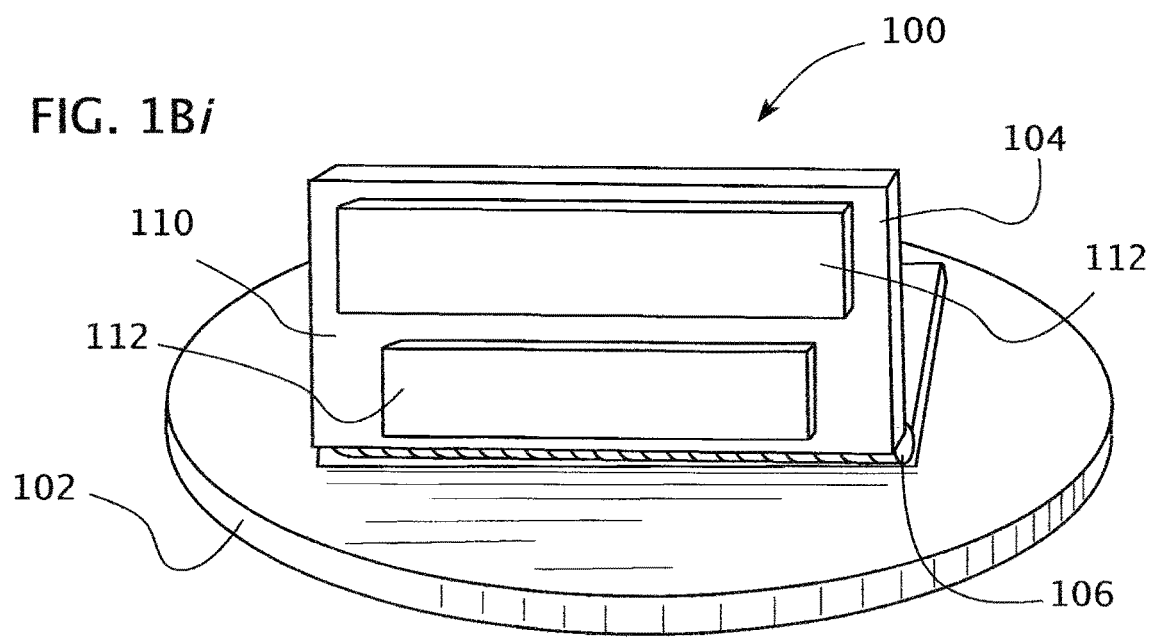
FIG. 1B*i*
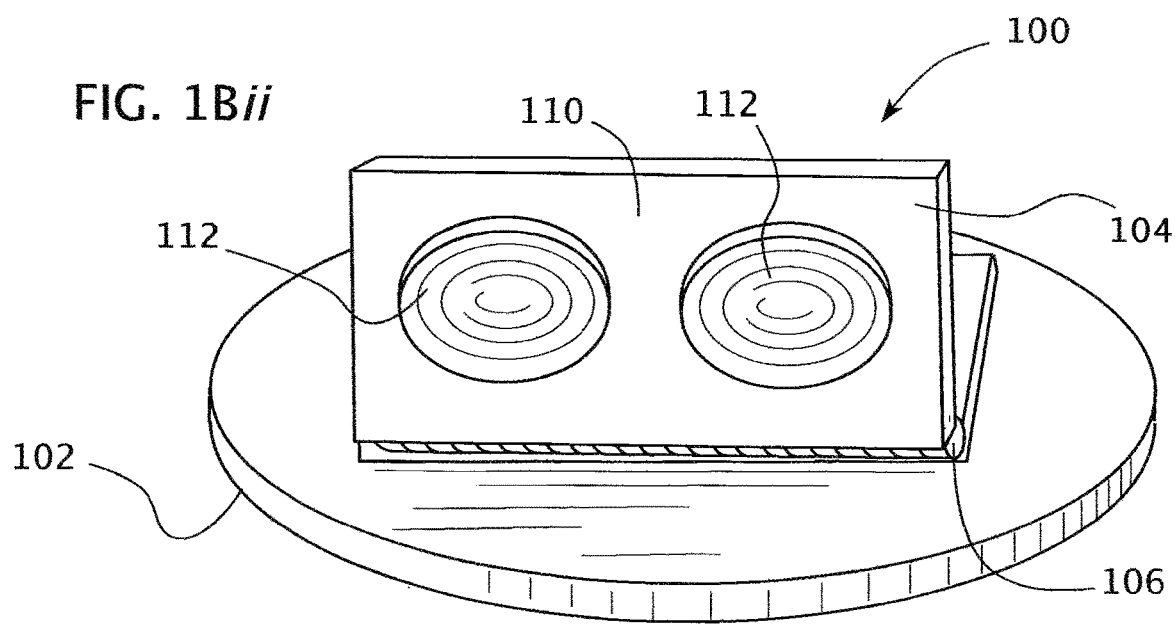
FIG. 1B*ii*

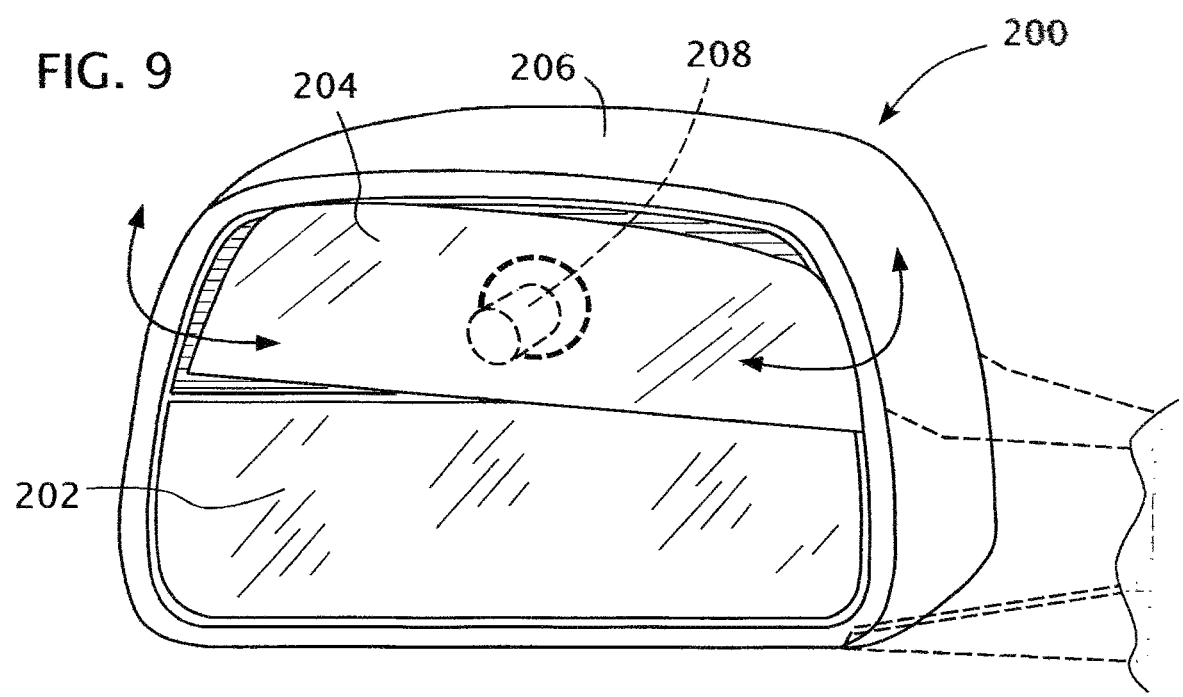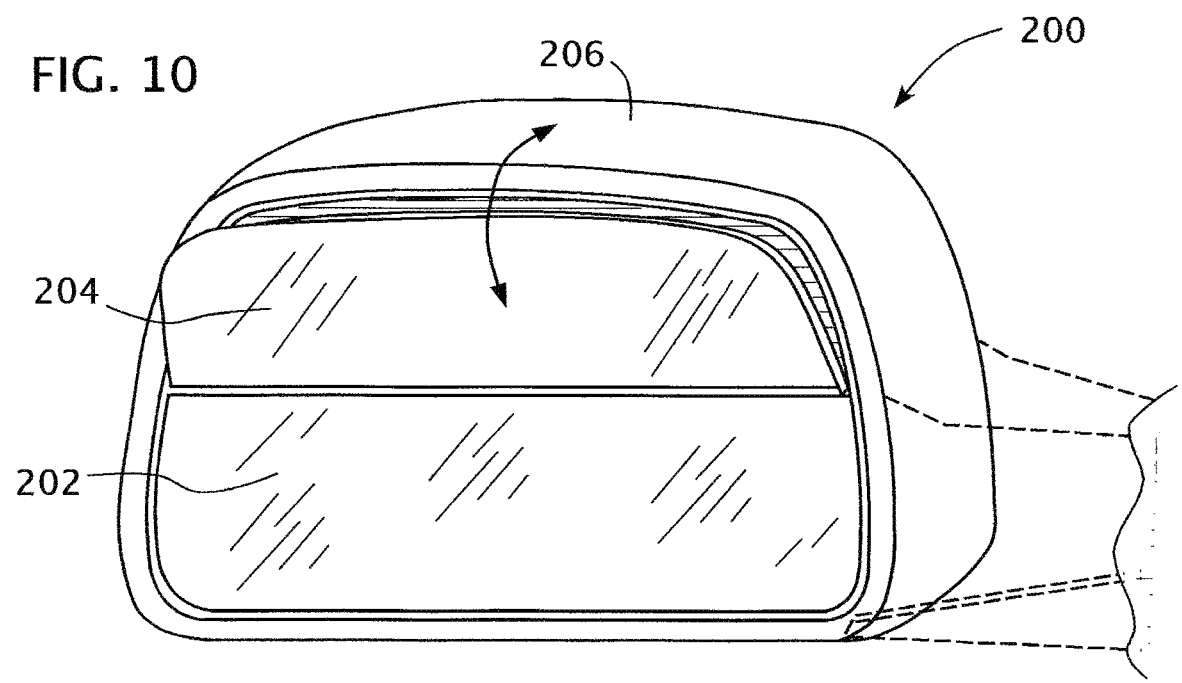

MIRROR ASSEMBLY

CROSS-REFERENCE TO RELATED APPLICATIONS AND CLAIM OF PRIORITY

Benefit of United States Provisional Patent Application Ser. No. 62/666,695, filed on May 3, 2018, is claimed.

BACKGROUND

The present invention relates generally to driving aids. More particularly, the present invention relates to approaches to minimizing hazards associated with operating a vehicle in the face of incomplete visibility into the surrounding environment.

In the case of motorists driving forward with vehicles or cyclists approaching and gaining from the rear on either side standard flat external mounted rear-view mirrors have the characteristic blind spot. This poses an extreme hazard as it lulls the driver into changing lanes when it is not safe to do so with a vehicle flanking on either side.

One approach has been to utilized small mountable fish eye mirrors affixed to the cars external rear view mirror to offer a wider viewing angle and eliminating the blind spot. Such mirrors increase the apparent distance of the approaching vehicle significantly, which may be enough to lull the driver equipped with said fish eye mirror to change lanes leading to a collision with the flanking vehicle.

In the case of backing up in between two other vehicles immediately on either side it is impossible to see around the corner of the two flanking vehicles to detect oncoming traffic. This includes cars, cyclists and pedestrians. This is another known blind spot for motorists.

SUMMARY

Briefly, and in general terms, the present invention provides a mirror assembly in which a blind spot mirror is linked via a hinge connector to a mounting member, with said mounting member including a mounting means for releasably mounting the mirror assembly to a surface.

Another embodiment of the present invention provides a mirror assembly in which a blind spot mirror is linked to a linkage plate via a first hinge connector and the linkage plate is linked to a mounting member via a second hinge connector, said mounting member including a mounting means for releasably mounting the mirror assembly to a surface.

Another embodiment of the present invention provides a vehicle side view mirror system in which a side view mirror and a blind spot mirror are mounted in a housing configured for mounting on the exterior of a vehicle. The blind spot mirror is mounted in the housing adjacent to the side view mirror and coupled to the housing via a hinge connector.

In more particular aspects of the above embodiments, the hinge connector can provide for relative rotation of joined members in one or more axes. In another particular aspect of the above embodiments, means for remote adjustment of the position of the blind spot mirror are included.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1A is a front left perspective view of the embodiment of the mirror assembly; while FIG. 1Bi and FIG. 1Bii are each rear perspective views of two aspects of the embodiment showing mounting means disposed on the reverse side of the mounting member;

FIG. 3A is a front right perspective view of the mirror assembly mounted in place on top of a side view mirror of a vehicle.

FIG. 9 is a front perspective view of a vehicle side view mirror system in accordance with an embodiment of the present invention with a side view mirror and blind spot mirror situated one over the other; and FIG. 10 is a front perspective view of a vehicle side view mirror system in accordance with another embodiment with a side view mirror and blind spot mirror situated one over the other.

Figure 1A:
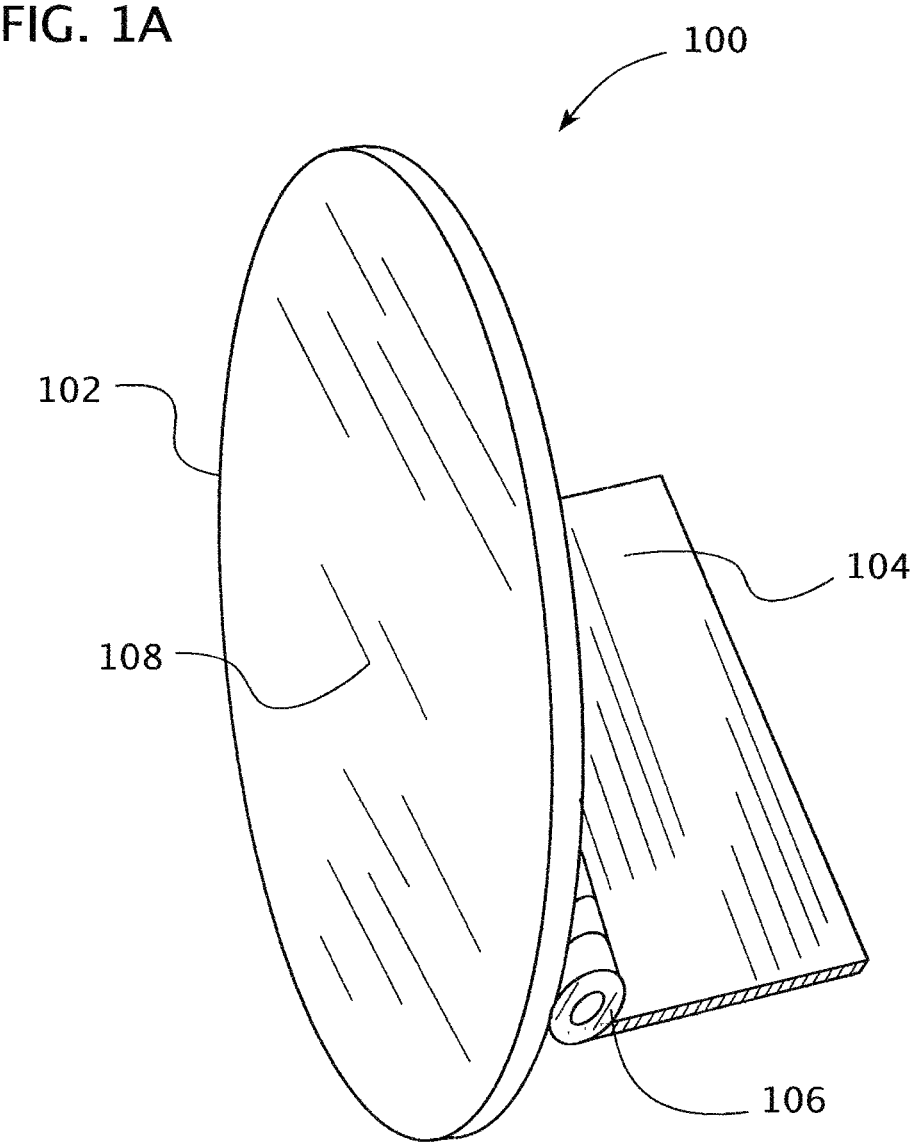
FIGS. 1A, B show a mirror assembly in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

In describing embodiments of the present invention, the following terminology will be used.

The singular forms "a," "an," and "the" include plural referents unless the context clearly dictates otherwise. Thus, for example, reference to "a needle" includes reference to one or more of such needles and "etching" includes one or more of such steps.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "50-250 micrometers should be interpreted to include not only the explicitly recited values of about 50 micrometers and 250 micrometers, but also include individual values and sub-ranges within the indicated range. Thus, included in this numerical range are individual values such as 60, 70, and 80 micrometers, and sub-ranges such as from 50-100 micrometers, from 100-200, and from 100-250 micrometers, etc. This same principle applies to ranges reciting only one numerical value and should apply regardless of the breadth of the range or the characteristics being described.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill. Further, unless otherwise stated, the term "about" shall expressly include "exactly," consistent with the discussion above regarding ranges and numerical data.

As used herein, the terms "hinge" and "hinge connector" refers to a mechanical linkage between two structures that provides rotational movement of one structure relative to the other structure around at least one axis. This includes not only single-axis hinges but also linkages that provide two or more axes of movement, such as ball joints and the like.

The term "user" refers to an entity, e.g. a human, that operates a device according to the present invention in order to bring about a desired effect or outcome, particularly provide the user with a line of sight into a blind spot of a vehicle. In a particular case, the user is one that is operating a vehicle or at least that occupies the position and perspective within the vehicle that is required to operate the vehicle. For such a user, the terms "user" and "driver" may be used herein interchangeably.

A mirror assembly according to the present invention can comprise a blind spot mirror coupled to a mounting member by at least one hinge connector. According to one embodiment, an example of which shown in FIGS. 1A and 1B, a mirror assembly 100 can comprise a blind spot mirror 102 coupled to a mounting member 104 by a hinge connector 106 which is a single-axis hinge. The reflective surface 108 of the blind spot mirror 102 will face the general direction of the blind spot, while the reverse side 110 of the mounting member 104 faces the surface onto which the mirror assembly 100 is mounted. (See also FIG. 2. for an illustration of placement.)

As shown in FIG. 1B, the reverse side 110 of the mounting member 104 can include one or more mounting means 112 by which the mirror assembly 100 can be made to releasably adhere to a surface on which it is mounted. In some embodiments as shown by example in FIG. 1Bi, the mounting means 112 can comprise a material construct such as magnetic material, adhesive tape, hook-and-loop fasteners, pressure-sensitive adhesive, and the like. In still another embodiment, the mounting means 112 can comprise a mechanical means for holding the mirror assembly in place. In a specific embodiment, as illustrated in FIG. 1Bii, the mounting means 112 can comprise one or more suction cups.

In still another embodiment, the mounting means can comprise a mechanical fastener such as a clamp, clip, screw, or combination thereof.

Figure 2:
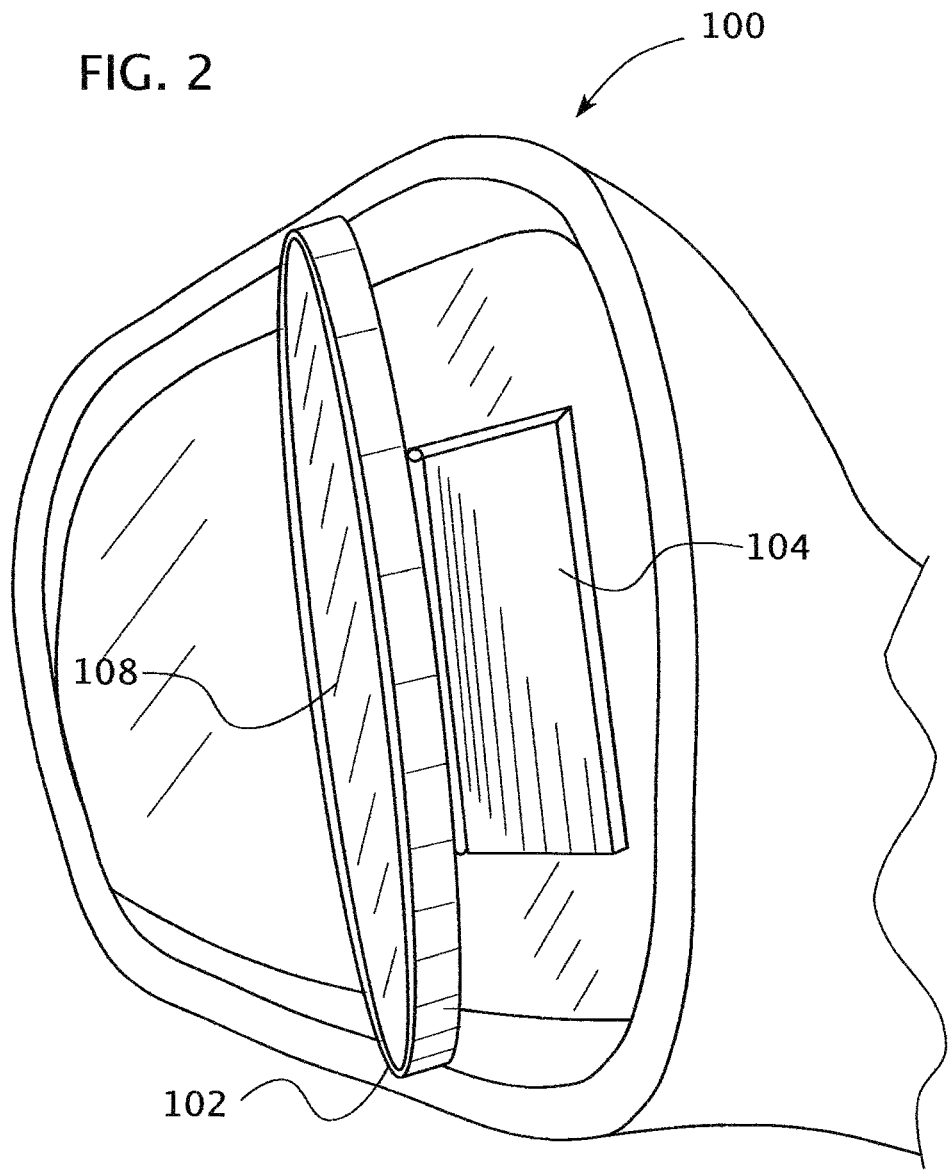
FIG. 2 is a left view of the embodiment of FIG. 1A mounted in place on a side view mirror of a vehicle.

The mirror assembly may be strategically mounted on a vehicle to allow the user to see approaching traffic-motorists, cyclists and pedestrians in various blind spots. In a particular aspect of this embodiment, the mirror assembly can be mounted on the side view mirror of a vehicle so as to provide to a user driving the vehicle a line of sight into the vehicle's blind spot. In particular, as shown in FIG. 2, the mirror assembly 100 can be mounted on the surface of a side view mirror. Once mounted, the position of the hinge connector 106 can be adjusted to place the blind spot mirror 102 at an angle that allows the user to see the vehicle's blind spot in the blind spot mirror 102. More particularly, the angle between the mirror assembly's blind spot mirror 102 and the surface plane of the vehicle side view mirror may be widened to change the field of vision that is reflected in the blind spot mirror 102. This may allow the driver to see an approaching vehicle that is in the vehicle's blind spot without distortion of the apparent distance of the approaching vehicle.

The blind spot mirror 102 in this embodiment can have a substantially flat reflective surface 110 so as to minimize distortion of the image viewed by the user. Alternatively, the blind spot mirror 102 can have a convex or aspheric reflective surface, to provide for particular applications in which augmentation of the field of view is desired, e.g. for use on the passenger side of a vehicle. In a particular embodiment, the blind spot mirror 102 can include a material that enhances its reflective function in some way, such as to reduce glare produced by sunlight or the headlights of other vehicles. It is contemplated that when this embodiment of the mirror assembly 100 is in place, at least a portion of the side view mirror is left uncovered and available for conventional use. The blind spot mirror 102 may be between $\frac{1}{10}$ to $\frac{3}{10}$ of the area of a vehicle side view mirror. In some embodiments, the blind spot mirror 102 may be between $\frac{1}{3}$ to $\frac{1}{5}$ the size of a vehicle side view mirror. In another aspect the blind spot mirror 102 can have an area from about 1.0 square inch and about 36.0 square inches. In a more particular aspect, the area of the blind spot mirror 102 is from about 4.0 square inches to about 16.0 square inches. In another particular aspect, the area of the blind spot mirror 102 is from about 9.0 square inches to about 25.0 square inches. The mirror assembly 100 can be mounted on the side view mirror on either the driver side or the passenger side of the vehicle.

Figure 3A:
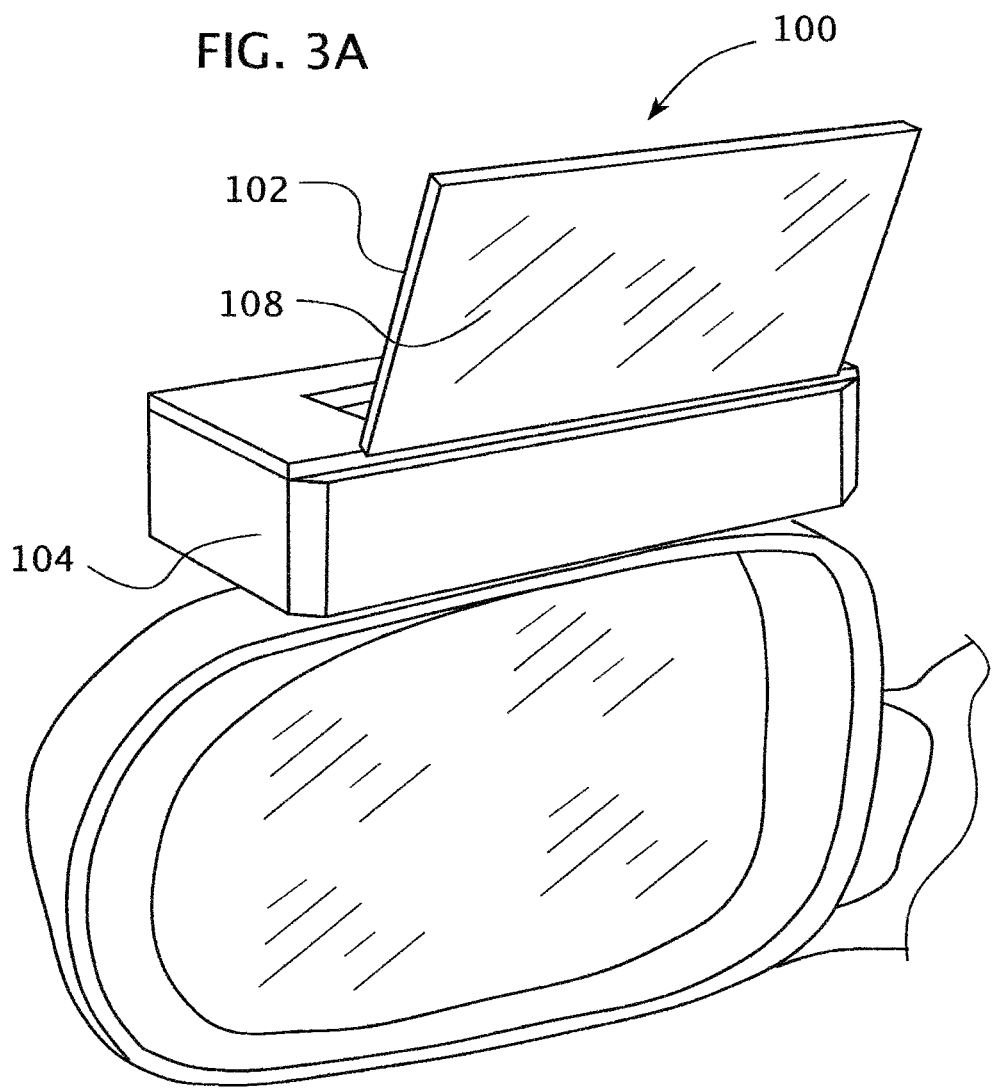
FIGS. 3A, B show a mirror assembly in accordance with another embodiment of the present invention.
Figure 3B:
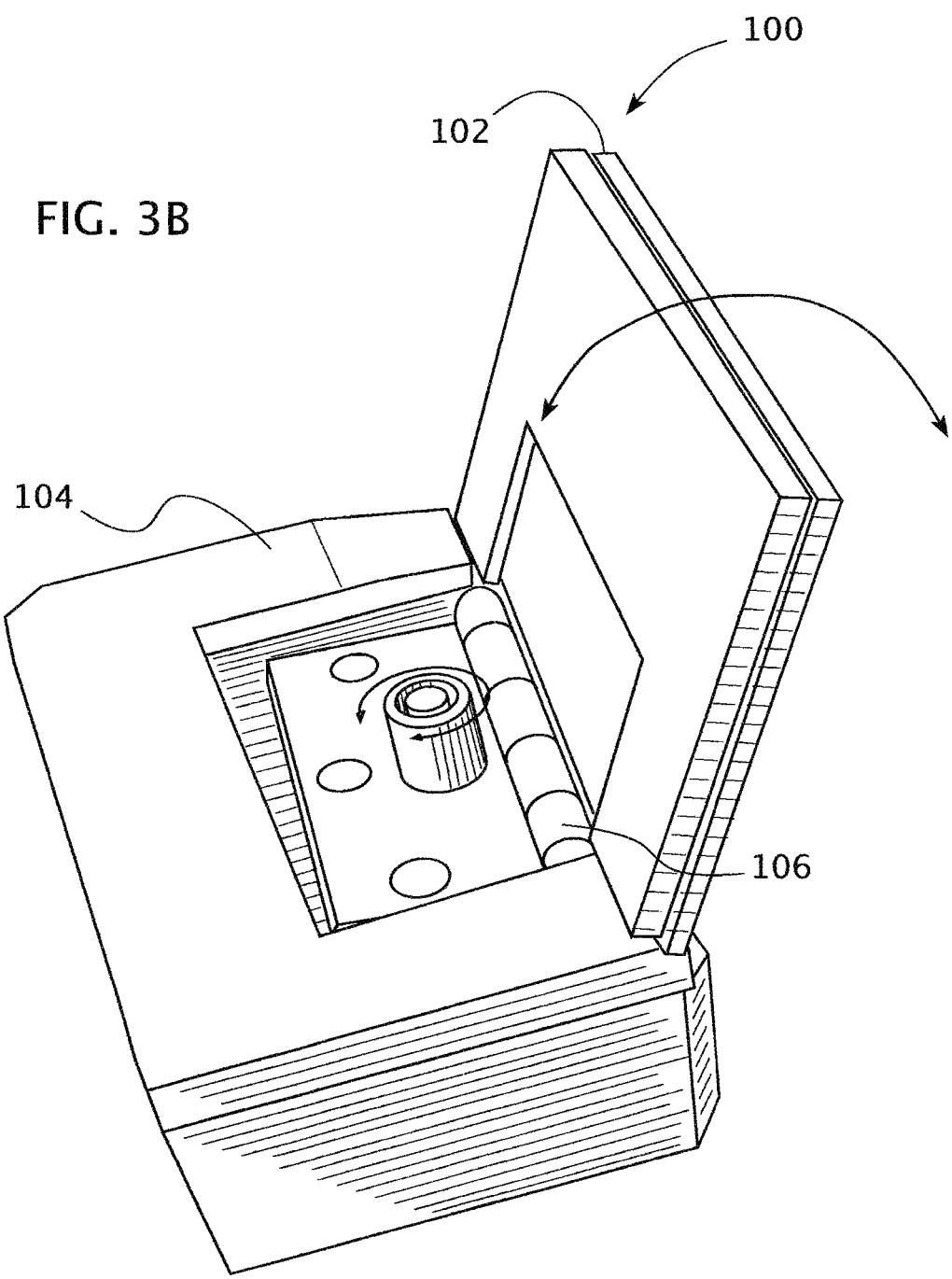
FIG. 3B is a rear right perspective view of the mirror assembly of FIG. 3A, showing the hinge connector and possible movement thereof.
Figure 4:
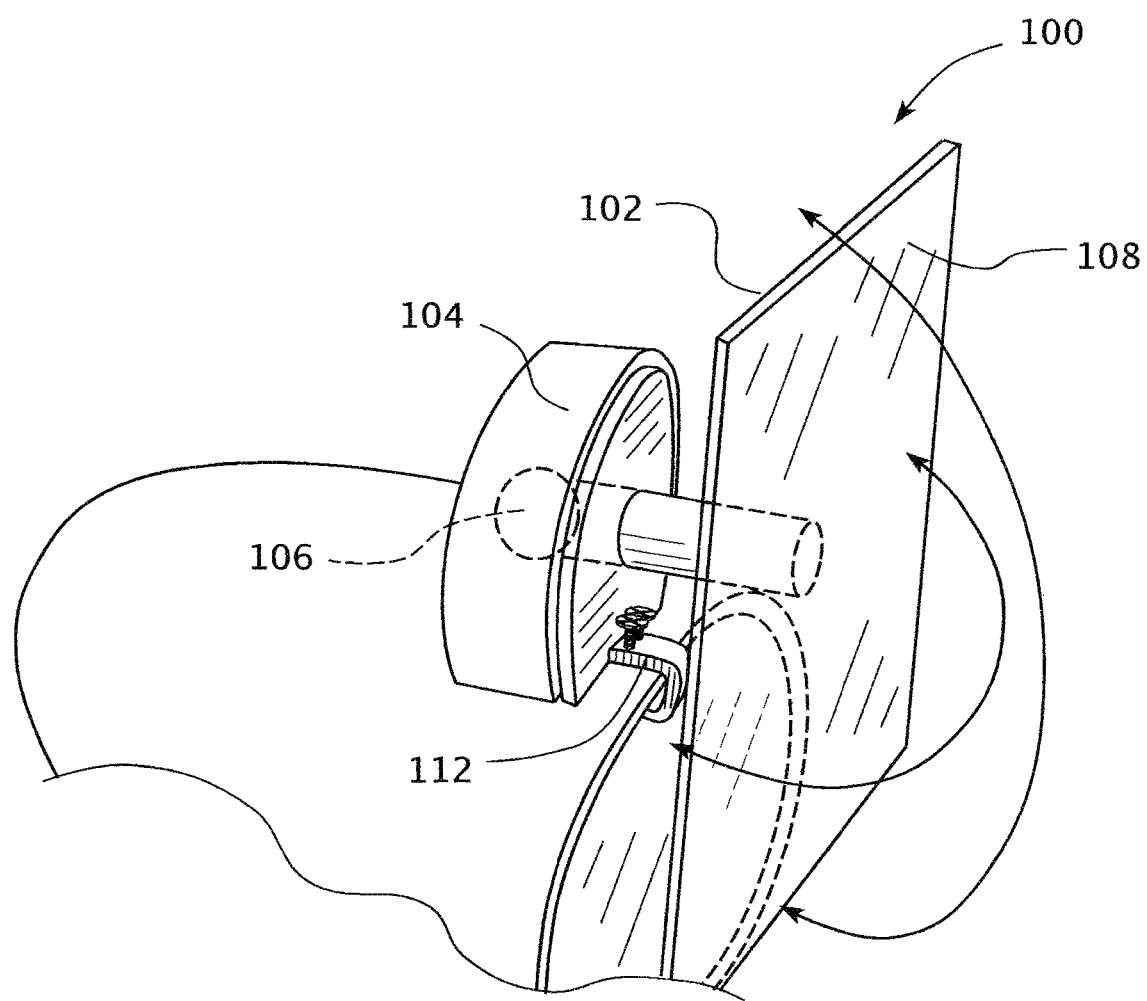
FIG. 4 is a front right perspective view of a mirror assembly in accordance with another embodiment of the present invention mounted in place on top of a side view mirror of a vehicle.

A mirror assembly in accordance with the present invention can also be utilized by mounting it on top of a side view mirror of a vehicle. Once mounted, so that rotation of the hinge connector can move the blind spot mirror up away from the mounting member and into a desired viewing position. In an embodiment suited to this use as shown in FIGS. 3A, 3B, and 4, a mirror assembly 100 can comprise a blind spot mirror 102 coupled to a mounting member 110 by a hinge connector 106, and further includes a mounting means 112 (such as the screw clamp as shown by example in FIG. 4) by which the mirror assembly 100 can be mounted on top of a vehicle side view mirror. In an example aspect as shown in FIG. 3B, a hinge connector 106 can comprise a dual-axis hinge so as to provide rotation in two axes, i.e. horizontal and vertical, so that blind spot mirror 102 of the mirror assembly 100 can be rotated around both the vertical axis and the horizontal axis to provide an appropriate viewing angle for a range of user heights and/or vehicle sizes. In another aspect of this embodiment, as shown in FIG. 4, the blind spot mirror 102 can be coupled to the mounting member 110 by a hinge connector 106 providing movement over many axes, such as a ball joint, so as to provide a large degree of freedom in positioning the blind spot mirror 102.

In accordance with the present invention, a mirror assembly may be mounted on the rear quarter panel of a vehicle to provide a user inside the vehicle with a line of sight substantially aligned with the rear of the vehicle. The angle can be so adjusted as to reflect an image of approaching traffic into the vehicle's side view mirror thus rendering said traffic visible to the driver. This may be useful if a user's vehicle is parked next to another vehicle or other object obstructing the user's view of traffic that the rear of the vehicle may encounter when reversing out of the parking spot.

Figure 5:
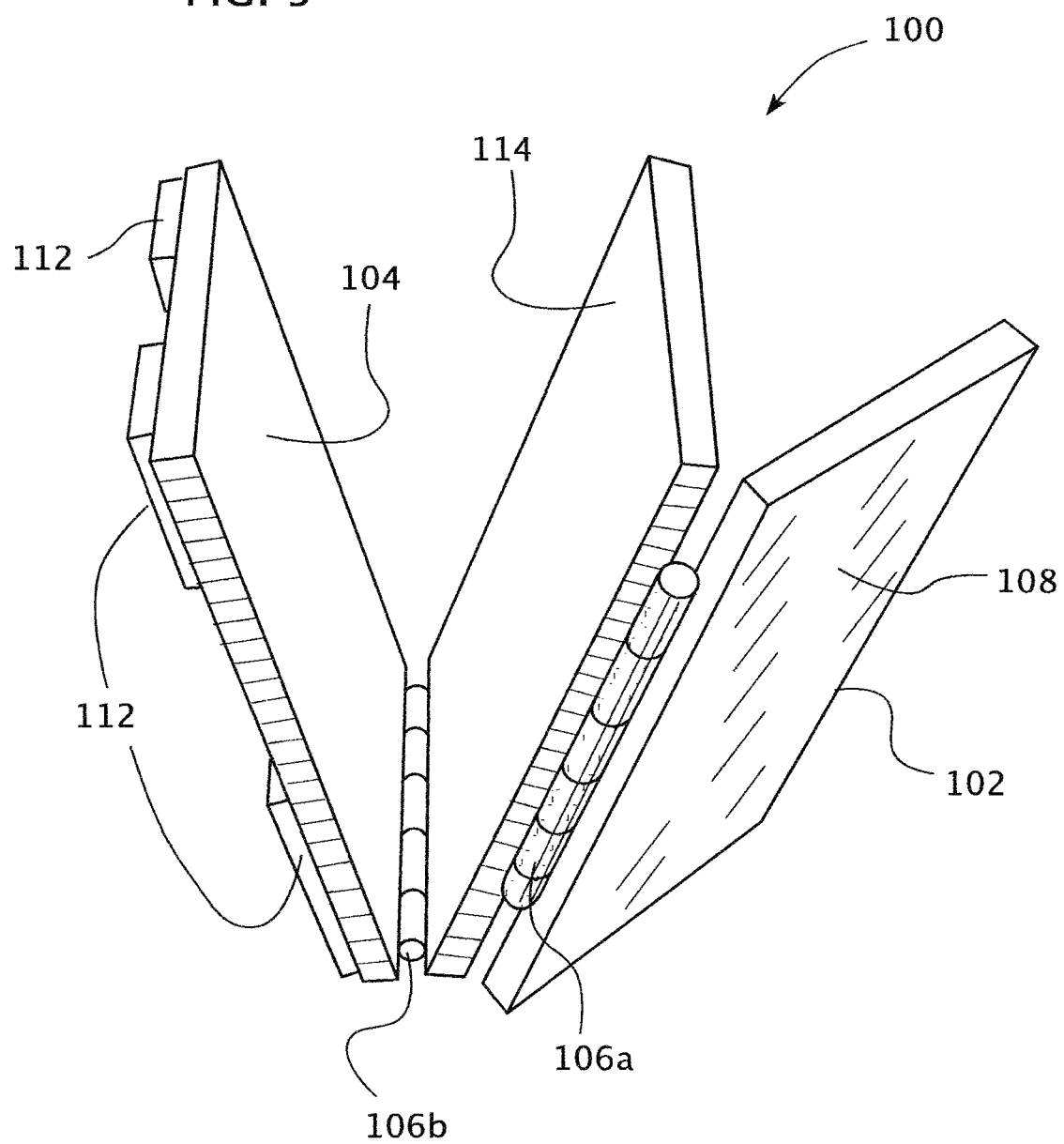
FIG. 5 is a perspective view of a mirror assembly in accordance with another embodiment of the present invention, with the two hinge connectors partially extended.

In addition to the embodiments described above, another mirror assembly suited to aiding backing up a vehicle can comprise a blind spot mirror coupled to a mounting member via two hinge connectors that are coupled to each other by a linkage plate. An example of this embodiment of a mirror assembly 100 is shown in FIG. 5, where a blind spot mirror 102 is coupled to a linkage plate 114 by a first hinge connector 106a, and the linkage plate 114 is in turn coupled by a second hinge connector 106b to a mounting member 110 that includes a mounting means 112. In a particular aspect, two hinge connectors 106a, 106b are situated such that the pivot axis of the first hinge connector 106a is substantially perpendicular to that of the second hinge connector 106b. In a specific aspect, the first hinge connector 106a and second hinge connector 106b are coupled to adjacent edges of the linkage plate 114.

Figure 6:
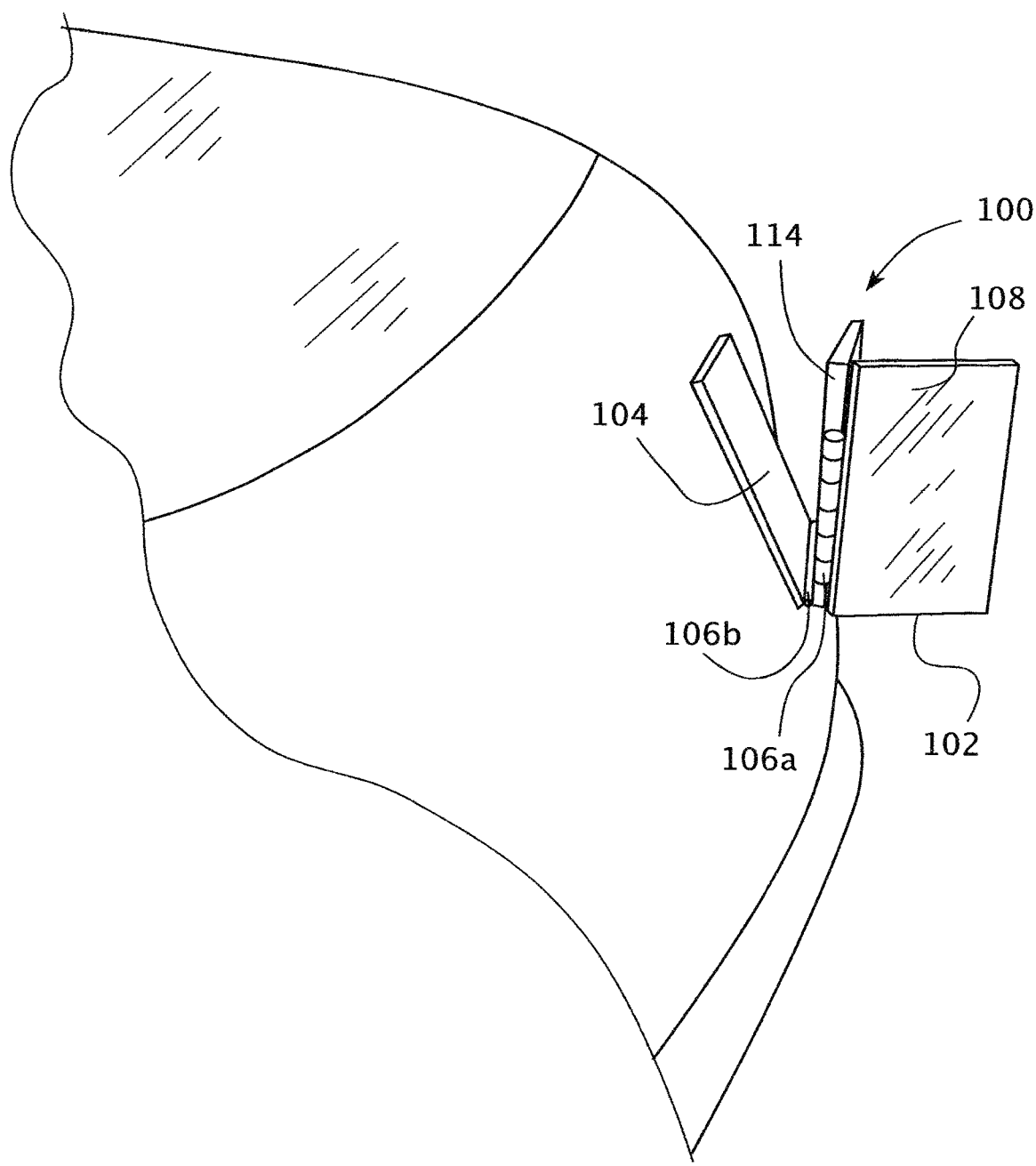
FIG. 6 is a perspective view of the embodiment of FIG. 5 shown mounted in place on the rear quarter panel of a vehicle.
Figure 7:
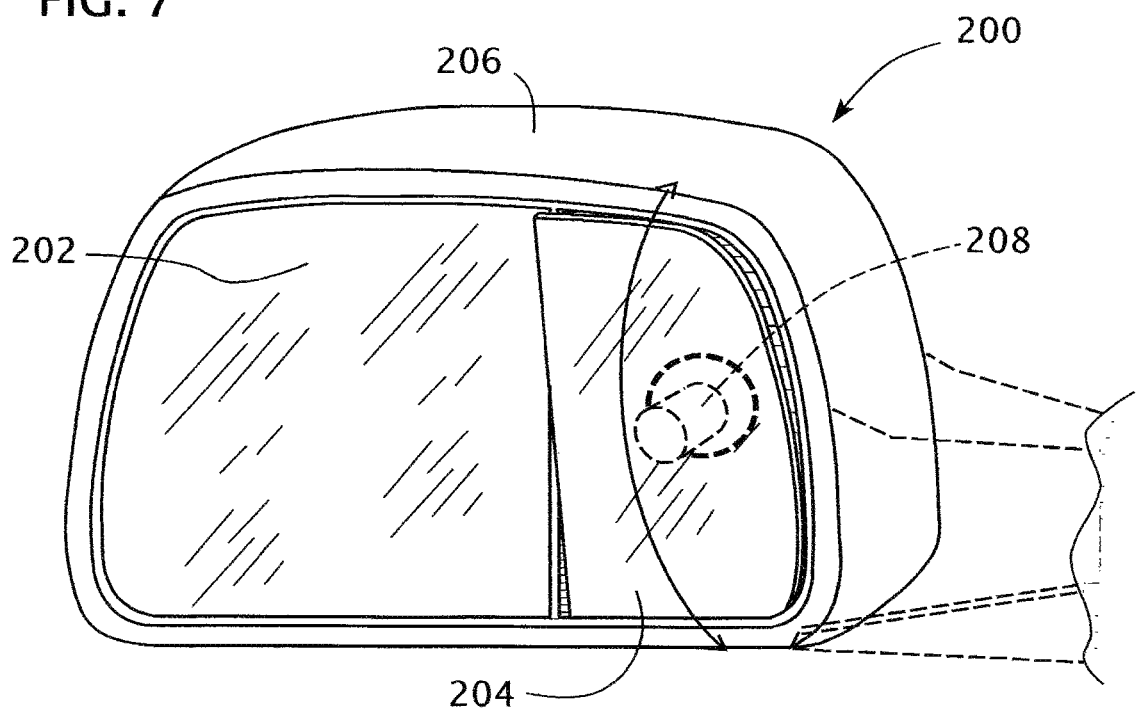
FIG. 7 is a front perspective view of a vehicle side view mirror system in accordance with an embodiment of the present invention with a side view mirror and blind spot mirror in a side-by side arrangement.
Figure 8:
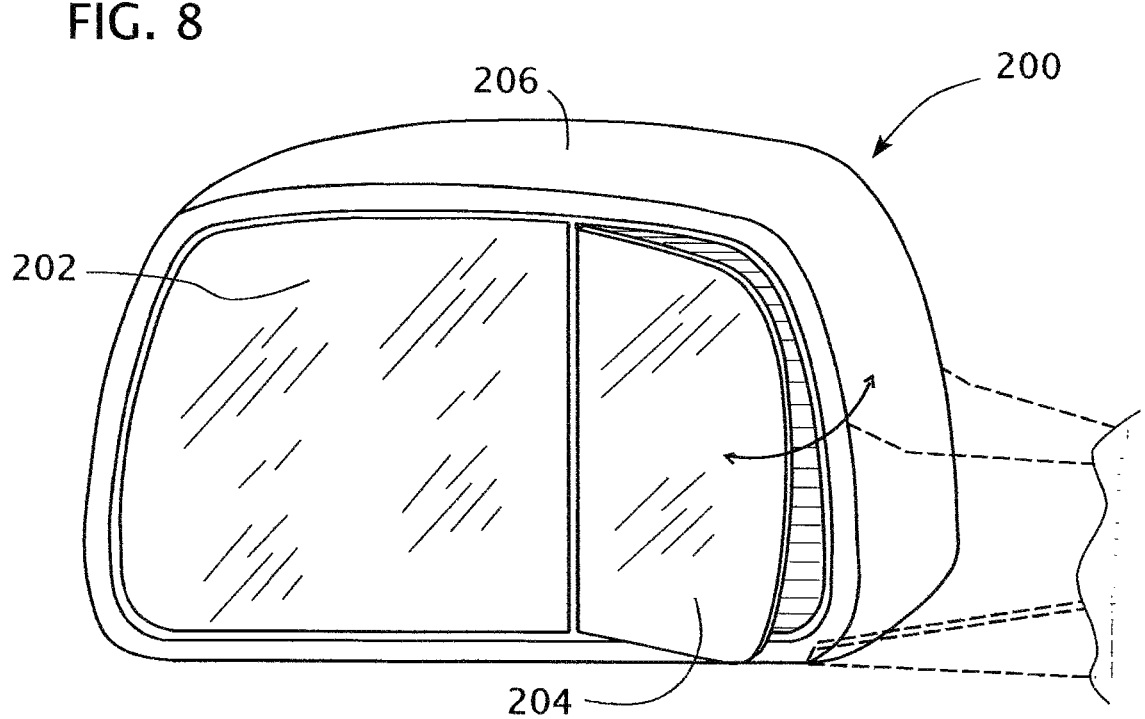
FIG. 8 is a front perspective view of a vehicle side view mirror system in accordance with another embodiment with a side view mirror and blind spot mirror in a side-by side arrangement.

It is contemplated that the mirror assembly 300 can be mounted via the mounting member 110 and mounting means 112 at the rear of a vehicle, e.g. the vehicle's rear quarter panel as shown in FIG. 6. Through operation of the second hinge connector 106b, the blind spot mirror 102 can positioned independently of the slant of the vehicle surface on which the mirror assembly 100 is mounted. In addition, through operation of the first hinge connector 106a, the angle of the blind spot mirror 102 with respect to the vehicle side view mirror can be adjusted to provide the user with a desired point of view from the rear of the vehicle. An angle adjustment of the blind spot mirror 102 on the plane perpendicular to that of the second hinge connector 106b may be performed when the second hinge connector is opened then the linkage plate is rotated from its initial position of being slanted against the vehicle panel to a final position in which the first hinge connector 106a is substantially perpendicular to the plane of the ground. (See FIG. 6. for an example.) To provide further freedom in positioning the blind spot mirror 102, one or both of the hinge connectors 106a and 106b can be of a type that provides rotation about more than one axis. In a particular embodiment, at least one of the hinge connectors 106a and 106b is a ball joint.

It is contemplated that a desired aspect of the above embodiments may be that, once adjusted to provide a desired line of sight, the hinge connector(s) will resistively hold their position to maintain that line of sight. As such, a particular aspect of the embodiments described herein is that the hinge connector may be configured as a friction hinge that will maintain a selected rotation position. More particularly, the hinge connector comprises a friction means that generates sufficient force to resist pivoting due to incidental forces acting directly or indirectly on the hinge connector.

Another aspect of the embodiments described herein is that any hinge connector can be connected to a motor configured to pivot the hinge connector about a pivot axis. In a specific embodiment, the motor can be a stepper motor that is not movable when powered off. In an alternate embodiment the motor can be movable when powered off so that the blind spot mirror can be adjusted manually. More particular aspects of these embodiments provide for means for powering the motor(s) and for actuating the motor(s), where such actuation can be accomplished by the user without the need to manually manipulate the mirror assembly. For example, a mirror assembly according to the present invention can include a wired circuit configured to deliver electrical energy from a power source, and a control element by which a user can control actuation of the motor. In an alternate embodiment, the hinge connector can include an independent power supply such as a battery, and circuitry configured to supply electrical energy to the motor. In another alternate embodiment, the mirror assembly includes a means for remote control of actuation of the motor. More particularly, the mirror assembly can include a transmitter for sending a signal to actuate the motor and a receiver for receiving the signal. The signal can be any one of a number of known short- to mid-range signals suited for the purpose, including infrared and radio frequency signals. Systems and approaches for remote control of hinges and other pivotable connectors are known in the art, as described for example in U.S. Pat. Nos. 7,755,004 and 7,886,409 which are hereby incorporated by reference.

It is contemplated that a mirror assembly can be provided as original equipment in a vehicle. Accordingly, an embodiment of the present invention, an example of which is shown in FIGS. 7 through 10, provides a vehicle side-view mirror system 200 that incorporates a side view mirror 202 and a blind spot mirror 204 situated in a housing 206 configured for mounting onto the exterior of a vehicle. The blind spot mirror 204 is coupled to the housing by a hinge connector 208. Various relative positions of the blind spot mirror 204 and side view mirror 202 are contemplated in accordance with the present invention. In some embodiments, the blind spot mirror 204 and side view mirror 202 are arranged roughly side-by-side (see, for example, FIGS. 7 and 8). In other embodiments, the blind spot mirror 204 and side view mirror 202 are arranged one above the other (see, for example, FIGS. 9 and 10 which show a specific embodiment in which the blind spot mirror 204 is situated above the side view mirror 202).

The coupling between the blind spot mirror 204 and the housing 206 provided by the hinge connector 208 is such that the angle of the blind spot mirror 204 can be adjusted about one or more axes independently of the side view mirror 202. As shown by example in FIGS. 8 and 10, in some embodiments the hinge connector 208 can allow the blind spot mirror 204 to be pivoted about an axis roughly parallel to the edge of the blind spot mirror 204 adjacent to the side view mirror 202. In other embodiments as shown by example in FIGS. 7 and 9, the hinge connector 208 can be of a type—for example a ball joint—that allows the blind spot mirror 204 to be pivoted about a plurality of axes.

As with existing side-view mirrors commonly found on vehicles, the side view mirror 202 provides a rearward view of objects adjacent to and rearward of the side on which the vehicle side-view mirror system 200 is mounted. The blind spot mirror 204 of the hinge mirror assembly 200 can function as an auxillary mirror that is independently positionable so that it can provide a different point of view. In a particular aspect, the blind spot mirror 204 can provide the user a line of sight into a blind spot that is outside the view provided by the side view mirror 202. In a particular embodiment, the side view mirror 202 may also be positionable by means independent of the blind spot mirror 204.

As the side view mirror is contemplated to be the primary side view mirror, with the blind spot mirror providing an auxiliary view, the surface area of the blind spot mirror constitutes 50% or less of the total mirror surface area of the vehicle side-view mirror system, that is, the sum of surface areas of the blind spot mirror and side view mirror. In a particular aspect the surface area of the blind spot mirror constitutes between 15% and 50% of the total mirror surface. In a more particular aspect, the surface area of the blind spot mirror constitutes between 15% and 30% of the total mirror surface. In another particular aspect, the surface area of the blind spot mirror constitutes between 25% and 50% of the total mirror surface.

It is further contemplated that the vehicle side view mirror system of the present invention can include means by which a user can adjust the angle of the blind spot mirror from within the vehicle. In a particular embodiment, the system comprises a mechanical means for remote adjustment of the blind spot mirror by the user. In a specific embodiment, a first end of a Bowden cable may be operably connected to the blind spot mirror and its second end is operably connected to a mechanical control in the passenger compartment of the vehicle. Other means for mechanical control of vehicle side view mirrors amenable to use with the present invention are well-known in the art, such as U.S. Pat. Nos. 3,545,290, 3,666,354, and 4,876,911, which are hereby incorporated by reference. In another particular embodiment, the position of the blind spot mirror may be remotely controlled by electric means such as motors and an electric circuit configured to actuate said motors in response to input from the user. Means of electric control of vehicle side view mirrors amenable to use with the present invention are well-known in the art, such as U.S. Pat. No. 4,519,677.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A mirror assembly, comprising a blind spot mirror linked via a hinge connector to a mounting member, wherein the hinge connector is configured directly behind the blind spot mirror and in contact with the blind spot mirror, and wherein a position of the hinge connector is adjusted to move the blind spot mirror and widen an angle of the blind spot mirror in relation to a side view mirror, and change a field of vision reflected in the blind spot mirror to allow an approaching vehicle to be seen without distortion of an apparent distance of the approaching vehicle, wherein the hinge connector is configured directly behind a rear portion of the entire blind spot mirror and in direct contact with the rear portion of the entire blind spot mirror and enables the entire portion of the blind spot mirror to widen the angle of the blind spot mirror, wherein the hinge connector is configured directly behind the entire blind spot mirror, and wherein the hinge connector provides a substantial friction to the blind spot mirror, wherein said friction is sufficient and intended to secure the blind spot mirror in a variety of positions with respect to the side view mirror while driving, and wherein the mounting member includes a mounting means for releasably mounting the mirror assembly to a surface.

2. The mirror assembly of claim 1, wherein the mounting means comprises at least one material construct selected from the group consisting of: magnetic material, adhesive tape, hook-and-loop fasteners, or pressure-sensitive adhesive.

3. The mirror assembly of claim 1, wherein the mounting means comprises at least one mechanical fastener selected from the group consisting of: a suction cup, a clamp, a clip, or a screw.

4. The mirror assembly of claim 1, wherein the blind spot mirror has a substantially flat reflective surface.

5. The mirror assembly of claim 1, wherein the hinge connector is selected from the group consisting of: single-axis hinge, dual-axis hinge, or ball joint.

6. The mirror assembly of claim 1, wherein the hinge connector is configured as a friction hinge.

7. The mirror assembly of claim 1, further comprising a motor functionally connected to the hinge connector.

8. The mirror assembly of claim 7, wherein the motor is remotely controllable.

9. The mirror assembly of claim 1, wherein the blind spot mirror has an area of from about 1.0 square inch to about 36.0 square inches.

10. The mirror assembly of claim 9, wherein the blind spot mirror has an area of from about 4.0 square inches to about 16.0 square inches.

* * * * *